(12) United States Patent
Lee et al.

(10) Patent No.: US 12,255,314 B2
(45) Date of Patent: Mar. 18, 2025

(54) NEGATIVE ACTIVE MATERIAL FOR RECHARGEABLE LITHIUM BATTERY AND RECHARGEABLE LITHIUM BATTERY INCLUDING THE SAME

(71) Applicant: SAMSUNG SDI CO., LTD., Yongin-si (KR)

(72) Inventors: Dae-Hyeok Lee, Yongin-si (KR); Young-Min Kim, Yongin-si (KR); Jaemyung Kim, Yongin-si (KR); Jaehou Nah, Yongin-si (KR); Changsu Shin, Yongin-si (KR); Jongmin Won, Yongin-si (KR)

(73) Assignee: SAMSUNG SDI CO., LTD., Yongin-si (KR)

( * ) Notice: Subject to any disclaimer, the term of this patent is extended or adjusted under 35 U.S.C. 154(b) by 73 days.

(21) Appl. No.: 17/085,007

(22) Filed: Oct. 30, 2020

(65) Prior Publication Data
US 2021/0143411 A1 May 13, 2021

(30) Foreign Application Priority Data
Nov. 7, 2019 (KR) .................. 10-2019-0142041

(51) Int. Cl.
*H01M 4/36* (2006.01)
*H01M 4/38* (2006.01)
(Continued)

(52) U.S. Cl.
CPC .......... *H01M 4/366* (2013.01); *H01M 4/364* (2013.01); *H01M 4/386* (2013.01); *H01M 4/587* (2013.01);
(Continued)

(58) Field of Classification Search
None
See application file for complete search history.

(56) References Cited

U.S. PATENT DOCUMENTS

2009/0029256 A1  1/2009  Mah et al.
2013/0115517 A1  5/2013  Kim et al.
(Continued)

FOREIGN PATENT DOCUMENTS

KR  10-2009-0011888 A  2/2009
KR  10-2013-0050704 A  5/2013
(Continued)

OTHER PUBLICATIONS

Korean Office Action dated Jan. 13, 2025, for corresponding Korean Patent Application No. 10-2019-0142041.

*Primary Examiner* — Zhongqing Wei
(74) *Attorney, Agent, or Firm* — Lee IP Law, P.C.

(57) ABSTRACT

A negative active material for a rechargeable lithium battery and a rechargeable lithium battery, the negative active material including secondary particles of agglomerated primary particles, the primary particles including Si particles with SiC on a surface of the Si particles; and an amorphous carbon surrounding the secondary particles, wherein a peak intensity ratio ($I_{Si(111)}/I_{SiC(111)}$) of a peak intensity ($I_{Si(111)}$) at a Si (111) plane relative to a peak intensity ($I_{SiC(111)}$) at a SiC (111) plane is about 5 to about 50 measured by X-ray diffraction analysis using a CuKα ray.

8 Claims, 3 Drawing Sheets

(51) Int. Cl.
*H01M 4/587* (2010.01)
*H01M 10/0525* (2010.01)
*H01M 4/02* (2006.01)

(52) U.S. Cl.
CPC .. *H01M 10/0525* (2013.01); *H01M 2004/021* (2013.01); *H01M 2004/027* (2013.01)

(56) References Cited

U.S. PATENT DOCUMENTS

| | | | |
|---|---|---|---|
| 2018/0159124 A1 | 6/2018 | Okai | |
| 2018/0226642 A1* | 8/2018 | Wang | H01M 4/366 |
| 2019/0233294 A1 | 8/2019 | Moon et al. | |
| 2019/0312264 A1* | 10/2019 | Shin | H01M 4/587 |
| 2021/0384497 A1* | 12/2021 | Nakano | H01M 4/622 |

FOREIGN PATENT DOCUMENTS

| | | | | |
|---|---|---|---|---|
| KR | 10-2015-0087751 A | | 7/2015 | |
| KR | 10-2018-0003577 A | | 1/2018 | |
| KR | 10-2019-0091411 A | | 8/2019 | |
| WO | WO-2014181447 A1 | * | 11/2014 | ........ H01M 10/0525 |

* cited by examiner

NEGATIVE ACTIVE MATERIAL FOR RECHARGEABLE LITHIUM BATTERY AND RECHARGEABLE LITHIUM BATTERY INCLUDING THE SAME

CROSS-REFERENCE TO RELATED APPLICATION

Korean Patent Application No. 10-2019-0142041, filed on Nov. 7, 2019, in the Korean Intellectual Property Office, and entitled: "Negative Active Material for Rechargeable Lithium Battery and Rechargeable Lithium Battery Comprising Same," is incorporated by reference herein in its entirety.

BACKGROUND

1. Field

Embodiments relate to a negative active material for a rechargeable lithium battery and a rechargeable lithium battery including the same.

2. Description of the Related Art

A rechargeable lithium battery has recently drawn attention as a power source for small portable electronic devices. The rechargeable lithium battery uses an organic electrolyte solution and thereby has twice or more of a discharge voltage than a battery using an alkali aqueous solution and accordingly, has high energy density.

As for a positive active material of a rechargeable lithium battery, a lithium-transition metal oxide having a structure capable of intercalating lithium ions, such as $LiCoO_2$, $LiMn_2O_4$, $LiNi_{1-x}Co_xO_2$ ($0<x<1$), or the like, has been used.

The above information disclosed in this Background section is only for enhancement of understanding of the background of the invention, and therefore it may contain information that does not form the prior art that is already known in this country to a person of ordinary skill in the art.

SUMMARY

The embodiments may be realized by providing a negative active material for a rechargeable lithium battery, the negative active material including secondary particles of agglomerated primary particles, the primary particles including Si particles with SiC on a surface of the Si particles; and an amorphous carbon surrounding the secondary particles, wherein a peak intensity ratio ($I_{Si(111)}/I_{SiC(111)}$) of a peak intensity ($I_{Si(111)}$) at a Si (111) plane relative to a peak intensity ($I_{SiC(111)}$) at a SiC (111) plane is about 5 to about 50 measured by X-ray diffraction analysis using a CuKα ray.

The amorphous carbon may fill pores between the primary particles.

The SiC may be continuously on the surface of the Si particles in a form of a layer, or the SiC may be discontinuously on the surface of the Si particles in a form of an island or a dot.

A thickness of the SiC on the surface of the Si may be about 5 nm or less.

The Si particles may be of a flake type.

The Si particles may have an aspect ratio of about 5 to about 20.

The Si particles may have a particle diameter of about 10 nm to 200 nm.

A full width at half maximum, FWHM (111), of a diffraction peak at a (111) plane found by X-ray diffraction of the Si particles using a CuKα ray may be about 0.5 degrees (°) to about 7 degrees (°).

The embodiments may be realized by providing a rechargeable lithium battery including a negative electrode including the negative active material according to an embodiment; a positive electrode; and an electrolyte.

The negative electrode may further include a crystalline carbon as an additional negative active material.

The negative electrode cathode may further include a crystalline carbon as an additional negative active material, and a peak intensity ratio ($I_{Gr(002)}/I_{SiC(111)}$) of a peak intensity ($I_{Gr(002)}$) at a crystalline carbon (002) plane relative to a peak intensity ($I_{SiC(111)}$) at a SiC (111) plane, measured by X-ray diffraction analysis using a CuKα ray may be about 150 to about 1,500 in the negative electrode.

BRIEF DESCRIPTION OF THE DRAWINGS

Features will be apparent to those of skill in the art by describing in detail exemplary embodiments with reference to the attached drawings in which.

DETAILED DESCRIPTION

Figure 1:
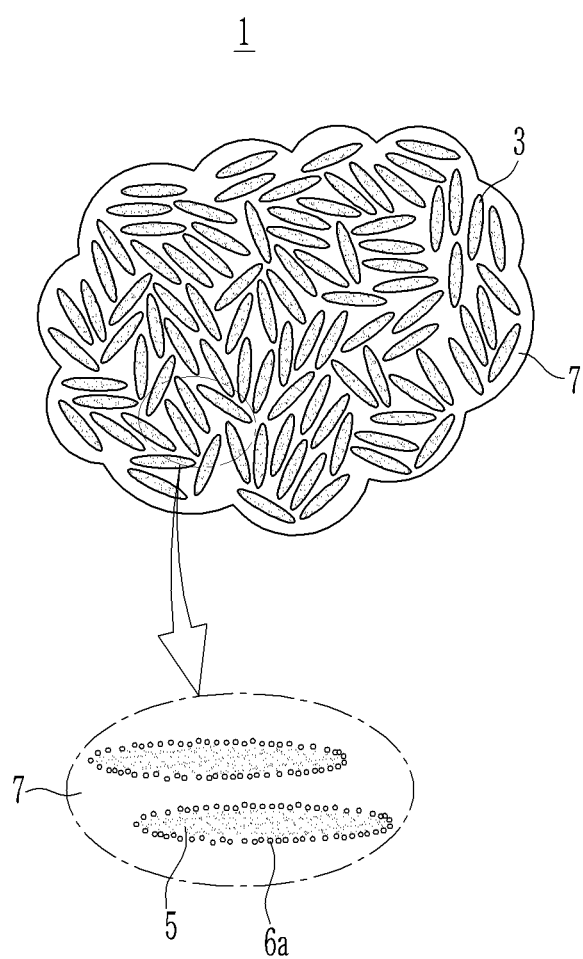
FIG. 1 is a schematic view of a structure of a negative active material according to one embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. It will also be understood that when a layer or element is referred to as being "on" another layer or element, it can be directly on the other layer or element, or intervening layers may also be present. In addition, it will also be understood that when a layer is referred to as being "between" two layers, it can be the only layer between the two layers, or one or more intervening layers may also be present. Like reference numerals refer to like elements throughout.

A negative active material for a rechargeable lithium battery according to one embodiment may include, e.g., secondary particles (formed by agglomerating at least one of primary particle which includes Si particles and SiC on a surface of the Si particles); and an amorphous carbon surrounding the secondary particles. In an implementation, a peak intensity ratio ($I_{Si(111)}/I_{SiC(111)}$) of a peak intensity ($I_{Si(111)}$) at a Si (111) plane relative to a peak intensity ($I_{SiC(111)}$) at a SiC (111) plane may be, e.g., about 5 to about 50 as measured by X-ray diffraction analysis using a CuKα ray. The peak intensity may refer to peak height.

When the peak intensity ratio ($I_{Si(111)}/I_{SiC(111)}$) of the negative active material is within the above range, excellent initial efficiency and excellent charge rate capability and discharge rate capability, e.g., excellent high-rate charge rate capability and discharge rate capability, may be exhibited, and improved capacity retention may also be exhibited. If the peak intensity ratio ($I_{Si(111)}/I_{SiC(111)}$) of the negative active material were to be less than 5, deteriorated initial efficiency may be exhibited, reduced charge rate capability and discharge rate capability, e.g., abruptly deteriorated high-rate charge rate capability may be exhibited, and low capacity retention may be exhibited. If the peak intensity ratio ($I_{Si(111)}/I_{SiC(111)}$) were to be more than 50, the charge rate capability, e.g., high-rate charge rate capability may be deteriorated and the low capacity retention may be exhibited.

The X-ray diffraction analysis is performed under a measurement condition of $2\theta=40°$ to $50°$, a scan speed (°/S) of 0.01 to 2, and a step size (°/step) of 0.005 to 0.1 by using a CuKα ray as a target ray.

Figure 2:
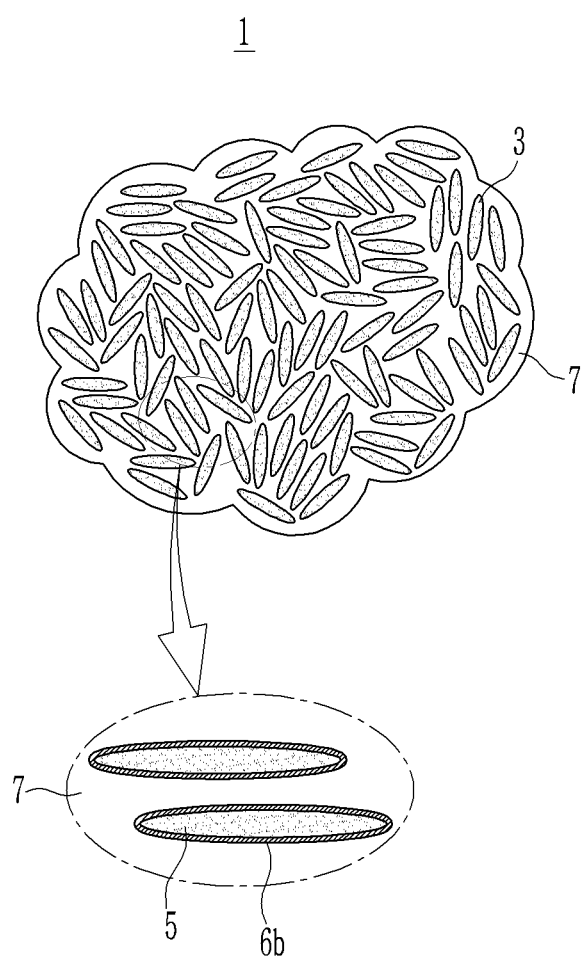
FIG. 2 is a schematic view of a structure of a negative active material according to another embodiment.

FIG. 1 illustrates a negative active material according to one embodiment and FIG. 2 illustrates shows a negative active material according to another embodiment. The negative active material 1 may include, e.g., secondary particles in which primary particles 3 are agglomerated, and an amorphous carbon 7 surrounding the secondary particles. In an implementation, the negative active material may have a structure of the secondary particles in which primary particles are agglomerated, covered with the amorphous carbon, and the secondary particles may be positioned inside of (e.g., completely covered by) the amorphous carbon, so that the secondary particles may be completely or substantially and mostly not exposed to the outside. In an implementation, both of the primary particles and the secondary particles may be surrounded by the amorphous carbon, so that all pores (e.g., in the secondary particles) generated during the preparation of the secondary particles by agglomerating the primary particles may be compactly filled with the amorphous carbon.

In an implementation, as illustrated enlarged in FIG. 1 and FIG. 2, the amorphous carbon 7 may be between the primary particles 3, and resultantly, the amorphous carbon 7 may be on the surface of the primary particles 3, so that structure collapse of the active material due to volume expansion occurring by inserting inside of the silicon primary particles may be more effectively prevented.

The primary particles 3 may include, e.g., Si particles with SiC on the surface of the Si particles. As shown in the inset of FIG. 1 in which the primary particles are shown enlarged, the SiC 6a may be discontinuously on a surface of the Si particles 5 in the form of an island or a dot. In an implementation, as shown in an enlarged view of the primary particles in FIG. 2, the SiC 6b may be continuously on the surface of the Si particles 5 in the form of a layer (e.g., as a continuous layer, that either completely covers the surface of the Si particle 5, or has holes therein and only partially covers the surface of the Si particle 5).

The SiC is a stable material having good mechanical strength and does not react well chemically (e.g., is relatively inert). As described above, when the SiC is on the surface of the Si particle, the breakage of the structure of the active material may be reduced or prevented and the volume expansion due to the reaction of Si with lithium during the charging may be inhibited during the charge and discharge, so that the long-term cycle-life characteristics may be enhanced and the electrical conductivity may be increased, thereby improving the high-rate charge and discharge performance.

The SiC may be on the surface of the Si particle surface at a thickness of about 5 nm or less, e.g., about 2 nm to about 5 nm. The thickness of the SiC may refer to a length or distance from the surface of the Si particles to the outermost surface of the SiC, regardless of the form of SiC on the surface of the Si particles, e.g., in the form of a continuous layer or in the form of an island or dot. Alternatively, the thickness of the SIC may refer to a particle diameter. In an implementation, if the SiC is in the form of the continuous layer, the thickness refers to a thickness of the layer, and if the SiC is in the form of an island or a dot, the thickness is a distance from the surface of the Si particles to the outermost surface of the island or is a diameter of a dot (e.g., a distance from the surface of the Si particles to the outermost surface of the dot).

The SiC is a stable material which has good mechanical strength and does not chemically react well, so that although the SiC is formed at a thickness of about 5 nm or less, e.g., is used at a relatively small amount, the structure of the active material may be effectively maintained, the capacity loss may be minimized, and the structure of the active material during the charge and the discharge may be well maintained. If the thickness of the SiC were to be more than 5 nm, the capacity of the active material may be abruptly reduced.

A particle diameter of the SiC (e.g., when the SiC is in the form of a distinct particle) may be about 3 nm to about 5 nm. The particle diameter may be an average particle diameter of the particle diameters. Herein, the average particle diameter may be a particle diameter D50 which is measured by cumulative volume. Such a particle diameter D50 indicates an average particle diameter D50 where a cumulative volume is about 50 volume % in a particle distribution, when a definition is not otherwise provided. When the particle diameter of the SiC particles is within the above range, the decrease in capacity may be minimized and the structure of the active material may be effectively maintained during the charge and discharge.

In an implementation, an amount of the SiC may be, e.g., about 5 wt % to about 20 wt %, based on 100 wt % of the entire negative active material. If the amount of the SiC is within the above range, the structure of the active material may be well maintained during the charge and the discharge, without a decrease in capacity.

The Si particles may be a flake type. In an implementation, the Si particles may be a flake type having a long axis and a short axis, and herein, the Si particles may have an aspect ratio (long axis/short axis, e.g., width/thickness) of about 5 to about 20. When the aspect ratio of the Si particles is within the above range, the volume change of lithium due to the charge and the discharge may be suppressed and the breakage of silicon particles due to the volume change may be reduced or prevented, thereby exhibiting excellent capacity retention.

The Si particles may have a particle diameter of about 10 nm to about 200 nm. The particle diameter may be an average particle diameter of the particle diameters. When the Si nanoparticles may be of a flake type, the particle diameter may be a length of the long axis. Herein, the average a particle diameter may be a particle diameter D50 which is measured by cumulative volume. Such a particle diameter D50 indicates an average particle diameter D50 where a cumulative volume is about 50 volume % in a particle distribution, when a definition is not otherwise provided. When the particle diameter of the Si particles is within the above range, the volume change of lithium due to the charge and the discharge may be suppressed and the breakage of silicon particles due to the volume change may be reduced or prevented, thereby exhibiting excellent capacity retention.

In an implementation, a full width at half maximum, FWHM (111), of a diffraction peak at a (111) plane found by X-ray diffraction of the Si particles using a CuKα ray may be, e.g., about 0.5 degrees (°) to about 7 degrees (°). When the full width at half maximum, FWHM (111), of the Si particles is within the range, the volume change of lithium due to the charge and the discharge may be suppressed and the breakage of silicon particles due to the volume change may be reduced or prevented, thereby exhibiting excellent capacity retention.

In an implementation, an amount of the Si may be about 40 wt % to about 70 wt %, based on 100 wt % of the entire negative active material. When the amount of Si is within the range, SEI (solid electrolyte interface) formation caused by a reaction of Si and an electrolyte may be effectively suppressed, and the deformation due to the volume change of the Si particles during the charge and the discharge may be more effectively inhibited.

In an implementation, a thickness of the amorphous carbon may be about 5 m to about 50 nm. The thickness of the amorphous carbon indicates a thickness of the amorphous carbon on the surface of the secondary particle (e.g., a shortest distance from an outer side of the secondary particle to an outer side of the amorphous carbon). When the amorphous carbon is on the surface of the secondary particles at a thickness of the range described above, the surface of the secondary particles may be sufficiently coated with the amorphous carbon, direct exposure of the secondary particles to the electrolyte may be more effectively prevented, SEI (solid electrolyte interface) formation may be inhibited, and the deformation due to the volume change may be further prevented.

In an implementation, the amount of the amorphous carbon may be about 20 wt % to about 50 wt %, based on 100 wt % of the entire negative active material. When the amount of the amorphous carbon falls into this range, direct exposure of the Si particles to the electrolyte may be prevented so that the SEI formation may be suppressed and the deformation due to the volume change may be further prevented.

In an implementation, the particle diameter of the secondary particles may be about 3 μm to about 20 μm. If the particle diameter of the secondary particles is within the range, excellent high-rate characteristic and the cycle-life characteristic may be exhibited. Furthermore, when the negative active material according to one embodiment is used together with a crystalline carbon negative active material, the negative active material of one embodiment may be well presented on the void space between the crystalline negative active material particles, and thus the contact may be maintained well and the volume expansion of the negative electrode may be minimized.

The negative active material according to one embodiment may be prepared by the following procedure.

First, the silicon particles may be prepared. The silicon particles may be nanoparticles, e.g., may be nanoparticles with a particle diameter of about 10 nm to about 200 nm. Such silicon nanoparticles may be obtained from a suitable technique for preparing nanoparticles, e.g., pulverization, etc. The silicon particles may be a flake type having a long axis and a short axis. In an implementation, the Si particles may have an aspect ratio (long axis/short axis, e.g., width/thickness) of about 5 to about 20. In an implementation, a full width at half maximum, FWHM (111) of a diffraction peak at a (111) plane found by X-ray diffraction of the Si particles using a CuKα ray may be about 0.5 degrees (°) to about 7 degrees (°).

The silicon particles may be dispersed in a solvent to prepare a dispersed liquid of the silicon particles. In an implementation, a dispersing agent may be further added to the dispersed liquid of the silicon particles. In an implementation, the dispersing agent may include, e.g., stearic acid or another suitable dispersing agent that helps disperse the silicon particles in a solvent. The solvent may include, e.g., isopropyl alcohol, ethanol, butanol, or a combination thereof. If the dispersing agent is further used, a mixing ratio of the silicon particles and the dispersing agent may be, e.g., about a 3:1 to about a 9:1 weight ratio. When the mixing ratio of the silicon particles and the dispersing agent is within the range, the dispersing agent may be uniformly distributed on the surface of the silicon particles to uniformly agglomerate and help prevent the oxidation during the spray drying.

The obtained dispersion liquid of the silicon particles may be spray dried. During the spray drying, the silicon particles may be agglomerated (assembled) to prepare an agglomerated product (particles inside of which pores are produced).

The spray drying may be performed at about 120° C. to about 170° C. When the spray drying is performed in this range of temperature, the silicon particles may be closely agglomerated, e.g., the silicon particles may be densely agglomerated to make the distance between the silicon particles very narrow, so that the pores inside may be very small. Accordingly, the amount of the amorphous carbon filled in the pores may be desirably decreased to a very small amount.

The obtained agglomerated product may be mixed with an amorphous carbon precursor. In an implementation, the mixing ratio of the agglomerated product and the amorphous carbon precursor may be, e.g., about 60:40 to about 40:60 by weight ratio.

In an implementation, the amorphous carbon precursor may include, e.g., coal pitch, mesophase pitch, petroleum pitch, mesocarbon pitch, coal oil, heavy petroleum oil, or a polymer resin such as a phenol resin, a furan resin, a polyimide resin, or the like.

In the mixing step, the amorphous carbon precursor may be partially inserted into the pores between the agglomerated product and thus, the silicon particles may contact the amorphous carbon precursor.

The obtained mixture may be heat-treated to prepare a negative active material for a rechargeable lithium battery. The heat-treatment may be performed at about 900° C. to about 1,100° C.

According to the heat-treatment, the silicon particles may be reacted with the amorphous carbon precursor which may contact the silicon particles in the mixture to prepare SiC, which may then be on the surface of the silicon particle, thereby preparing primary particles including Si particles and SiC on the surface of the Si particles and the amorphous carbon precursor may be carbonized to convert the amorphous carbon on the surface of the secondary particles. Furthermore, during this procedure, the amorphous carbon precursor filled in the pores may be carbonized to convert amorphous carbon on the surface of the primary particles. Resultantly, the secondary particles in which the primary particles are agglomerated may be surrounded with the amorphous carbon and the amorphous carbon may be filled between the primary particles.

When the heat-treatment is performed at the range of temperature described above, the amorphous carbon produced from the amorphous carbon precursor may uniformly surround the secondary particles, and the SiC generated from the partial chemical reaction may be distributed on the surface of the silicon particles. In an implementation, it may prepare a negative active material having a peak intensity ratio ($I_{Si(111)}/I_{SiC(111)}$) of a peak intensity ($I_{Si(111)}$) at a Si (111) plane relative to a peak intensity ($I_{SiC(111)}$) at a SiC (111) plane of about 5 to about 50 measured by X-ray diffraction analysis using a CuKα ray and improve the capacity retention and the high-rate characteristic. If the heat-treatment were to be performed at less than 900° C. or more than 1,100° C., a negative active material with a desirable peak intensity ratio ($I_{Si(111)}/I_{SiC(111)}$) may not be obtained.

In an implementation, the heat-treatment may be performed under an inert atmosphere. In an implementation, the inert atmosphere may be a mixed atmosphere of argon (Ar) and $H_2$ gas, a nitrogen gas atmosphere, an argon gas atmosphere, or a combination thereof. In an implementation, in case of using a mixed atmosphere of argon and $H_2$ gas as the inert atmosphere, the mixing ratio of argon and $H_2$ gas may be about a 99:1 to about 95:5 volume ratio. According to the heat-treatment, the amorphous carbon precursor may be converted into an amorphous carbon to include inside of the negative active material as the amorphous carbon.

If the heat-treatment were to be performed under an oxygen atmosphere, a silicon oxide may be prepared, and it may react with lithium during the charge and the discharge to produce a large amount of lithium oxide ($Li_2O$), thereby abruptly deteriorating the initial efficiency.

The position of SiC may depend on the temperature condition of heat treatment. In an implementation, when the heat treatment is performed under a condition of about 900° C. to about 1,000° C., the SiC may be on the surface of the Si particles as an island or a dot. In an implementation, when the heat treatment is performed under a condition of more than 1,000° C. and 1,100° C. or less, the SiC may be on the surface of the Si particles as a layer.

In an implementation, a rechargeable lithium battery may include a negative electrode, a positive electrode, and an electrolyte.

The negative electrode may include a current collector and a negative active material layer on the current collector, and the negative active material may include the negative active material according to one embodiment.

The negative active material layer may further include a crystalline carbon negative active material. The crystalline carbon negative active material may include graphite such as an unspecified shaped, sheet-shaped, flake-shaped, spherical-shaped or fiber-shaped natural graphite or artificial graphite.

When the negative active material layer includes the negative active material according to one embodiment as a first negative active material, and the crystalline carbon negative active material as a second negative active material, a mixing ratio of the first negative active material to the second negative active material may be, e.g., about 1:30 to 1:4 by weight. When the first negative active material and the second negative active material are used at this mixing ratio, a higher specific capacity may be exhibited, so that excellent energy density may be exhibited.

Regarding the negative electrode including the first and second negative active materials, a peak intensity ratio ($I_{Gr(002)}/I_{SiC(111)}$) of a peak intensity ($I_{Gr(002)}$) at a crystalline carbon (002) plane relative to a peak intensity ($I_{SiC(111)}$) at a SiC (111) plane measured by X-ray diffraction analysis using a CuKα ray may be about 150 to about 1,500. In an implementation, the peak intensity ($I_{Gr(002)}/I_{SiC(111)}$) of the negative electrode may be obtained from a negative electrode after a formation process of a battery including the negative electrode is performed. The formation process may be performed by charging and discharging the battery once to 3 times at 0.1 C.

If the peak intensity ratio ($I_{Gr(002)}/I_{SiC(111)}$) is within the above-described range, excellent initial efficiency and the excellent charge rate capability and discharge rate capability, e.g., excellent high-rate charge rate capability and discharge rate capability may be exhibited, and the improved capacity retention may also be exhibited. If the peak intensity ratio ($I_{Gr(002)}/I_{SiC(111)}$) were to be less than 150, deteriorated initial efficiency may be exhibited, and the decreased discharge rate capability and charge rate capability, e.g., the significantly deteriorated high-rate charge rate capability, may be exhibited, and the low capacity retention may be exhibited. If the peak intensity ratio ($I_{Gr(002)}/I_{SiC(111)}$) were to be more than 1,500, the charge rate capability, e.g., the high-rate charge rate capability, may be deteriorated, and the low capacity retention may be exhibited.

In the negative active material layer, the negative active material may be included in an amount of 95 wt % to 99 wt %, based on a total weight of the negative active material layer. As the negative active material, the negative active material according to one embodiment, e.g., when the silicon negative active material and the carbon negative active material are both used, a mixing ratio of the silicon negative active material and the carbon negative active material may be, e.g., about 1:30 to 1:4 by weight. If the mixing ratio of the silicon-based negative active material and the carbon-based negative active material satisfy this range, the high capacity may be exhibited, and the high capacity retention and the low expansion may also be obtained.

The negative active material layer may include a negative active material and a binder, and may further include a conductive material. In the negative active material layer, an amount of the binder may be, e.g., 1 wt % to 5 wt %, based on the total weight of the negative active material layer. When the negative active material layer includes a conductive material, the negative active material layer may include, e.g., 90 wt % to 98 wt % of the negative active material, 1 wt % to 5 wt % of the binder, and 1 wt % to 5 wt % of the conductive material, based on the total weight of the negative active material layer.

The binder adheres negative active material particles to each other well and also adheres negative active materials to the current collector. The binder may include a non-water-soluble binder, a water-soluble binder, or a combination thereof.

The non-water-soluble binder may include, e.g., polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, polyamideimide, polyimide, or a combination thereof.

The water-soluble binder may include, e.g., a styrene-butadiene rubber, an acrylated styrene-butadiene rubber (ABR), an acrylonitrile-butadiene rubber, an acryl rubber, a butyl rubber, a fluorine rubber, an ethylene propylene copolymer, polyepichlorohydrin, polyphosphazene, polyacrylonitrile, polystyrene, an ethylene propylene diene copolymer, polyvinylpyridine, chloro sulfonated polyethylene, latex, a polyester resin, an acryl resin, a phenol resin, an epoxy resin, polyvinyl alcohol, or a combination thereof.

When the water-soluble binder is used as a negative electrode binder, a cellulose compound may be further included to provide viscosity as a thickener. The cellulose compound may include, e.g., carboxymethyl cellulose, hydroxypropyl methyl cellulose, methyl cellulose, or alkali metal salts thereof. The alkali metals may include Na, K, or Li. The thickener may be included in an amount of, e.g., 0.1 parts by weight to 3 parts by weight, based on 100 parts by weight of the negative active material.

The conductive material may be included to provide electrode conductivity, and a suitable conductive material that does not cause a chemical change may be used. Examples of the conductive material may include a carbon-based material such as natural graphite, artificial graphite, carbon black, acetylene black, ketjen black, denka black, a carbon fiber, and the like; a metal material of a metal powder or a metal fiber including copper, nickel, aluminum silver, and the like; a conductive polymer such as a polyphenylene derivative; or a mixture thereof.

In an implementation, the current collector may include, e.g., a copper foil, a nickel foil, a stainless steel foil, a titanium foil, a nickel foam, a copper foam, a polymer substrate coated with a conductive metal, or a combination thereof.

The negative electrode may be prepared by mixing a negative active material, a binder, and optionally a conductive material in a solvent to prepare an active material composition, and coating the composition on a current collector. The solvent may include, e.g., water.

The positive electrode may include a positive current collector and a positive active material layer formed on the positive current collector.

The positive active material may include compounds that reversibly intercalate and deintercalate lithium ions (lithiated intercalation compounds). In an implementation, it may include a composite oxide of lithium and cobalt, manganese, nickel, or a combination thereof. More specific examples may be compounds represented by one of the following chemical formulae. $Li_aA_{1-b}X_bD_2$ ($0.90 \leq a \leq 1.8$, $0 \leq b \leq 0.5$); $Li_aA_{1-b}X_bO_{2-c}D_c$ ($0.90 \leq a \leq 1.8$, $0 \leq b \leq 0.5$, $0 \leq c \leq 0.05$); $Li_aE_{1-b} X_bO_{2-c}D_c$ ($0.90 \leq a \leq 1.8$, $0 \leq b \leq 0.5$, $0 \leq c \leq 0.05$); $Li_aE_{2-b} X_bO_{4-c}D_c$ ($0.90 \leq a \leq 1.8$, $0 \leq b \leq 0.5$, $0 \leq c \leq 0.05$); $Li_aNi_{1-b-c}Co_bX_cD_\alpha$ ($0.90 \leq a \leq 1.8$, $0 \leq b \leq 0.5$, $0 \leq c \leq 0.5$, $0 \leq \alpha \leq 2$); $Li_aNi_{1-b-c}Co_bX_cO_{2-\alpha}T_\alpha$ ($0.90 \leq a \leq 1.8$, $0 \leq b \leq 0.5$, $0 \leq c \leq 0.5$, $0 \leq \alpha \leq 2$); $Li_aNi_{1-b-c}Co_bX_cO_{2-\alpha}T_2$ ($0.90 \leq a \leq 1.8$, $0 \leq b \leq 0.5$, $0 \leq c \leq 0.5$, $0 \leq \alpha \leq 2$); $Li_aNi_{1-b-c}Mn_bX_cD_\alpha$ ($0.90 \leq a \leq 1.8$, $0 \leq b \leq 0.5$, $0 \leq c \leq 0.5$, $0 \leq \alpha \leq 2$); $Li_aNi_{1-b-c}Mn_bX_cO_{2-\alpha}T_\alpha$ ($0.90 \leq a \leq 1.8$, $0 \leq b \leq 0.5$, $0 \leq c \leq 0.5$, $0 \leq \alpha \leq 2$); $Li_aNi_{1-b-c}Mn_bX_cO_{2-\alpha}T_2$ ($0.90 \leq a \leq 1.8$, $0 \leq b \leq 0.5$, $0 \leq c \leq 0.5$, $0 \leq \alpha \leq 2$); $Li_aNi_bE_cG_dO_2$ ($0.90 \leq a \leq 1.8$, $0 \leq b \leq 0.9$, $0 \leq c \leq 0.5$, $0.001 \leq d \leq 0.1$); $Li_aNi_bCo_cMn_dG_eO_2$ ($0.90 \leq a \leq 1.8$, $0 \leq b \leq 0.9$, $0 \leq c \leq 0.5$, $0 \leq d \leq 0.5$, $0.001 \leq e \leq 0.1$); $Li_aNiG_bO_2$ ($0.90 \leq a \leq 1.8$, $0.001 \leq b \leq 0.1$); $Li_aCoG_bO_2$ ($0.90 \leq a \leq 1.8$, $0.001 \leq b \leq 0.1$); $Li_aMn_{1-b}G_bO_2$ ($0.90 \leq a \leq 1.8$, $0.001 \leq b \leq 0.1$); $Li_aMn_2G_bO_4$ ($0.90 \leq a \leq 1.8$, $0.001 \leq b \leq 0.1$); $Li_aMn_{1-g}G_gPO_4$ ($0.90 \leq a \leq 1.8$, $0 \leq g \leq 0.5$); $QO_2$; $QS_2$; $LiQS_2$; $V_2O_5$; $LiV_2O_5$; $LiZO_2$; $LiNiVO_4$; $Li_{(3-f)}J_2 PO_{43}$ ($0 \leq f \leq 2$); $Li_{(3-f)}Fe_2PO_{43}$ ($0 \leq f \leq 2$); and $Li_aFePO_4$ ($0.90 \leq a \leq 1.8$).

In the chemical formulae, A may be selected from Ni, Co, Mn, and a combination thereof; X may be selected from Al, Ni, Co, Mn, Cr, Fe, Mg, Sr, V, a rare earth element, and a combination thereof; D may be selected from O, F, S, P, and a combination thereof; E may be selected from Co, Mn, and a combination thereof; T may be selected from F, S, P, and a combination thereof; G may be selected from Al, Cr, Mn, Fe, Mg, La, Ce, Sr, V, and a combination thereof; Q may be selected from Ti, Mo, Mn, and a combination thereof; Z is selected from Cr, V, Fe, Sc, Y, and a combination thereof; and J may be selected from V, Cr, Mn, Co, Ni, Cu, and a combination thereof.

The compounds may have a coating layer on the surface, or may be mixed with another compound having a coating layer. The coating layer may include a coating element compound selected from an oxide of a coating element, a hydroxide of a coating element, an oxyhydroxide of a coating element, an oxycarbonate of a coating element, and a hydroxyl carbonate of a coating element. The compound for the coating layer may be amorphous or crystalline. The coating element included in the coating layer may include Mg, Al, Co, K, Na, Ca, Si, Ti, V, Sn, Ge, Ga, B, As, Zr, or a mixture thereof. The coating layer may be provided according to a suitable method having no adverse influence on properties of a positive active material by using these elements in the compound. In an implementation, the method may include, e.g., spray coating, dipping, or the like.

In the positive electrode, an amount of the positive active material may be 90 wt % to 98 wt %, based on a total weight of the positive active material layer.

In an implementation, the positive active material layer may further include a binder and a conductive material. In an implementation, each amount of the binder and the conductive material may be about 1 wt % to about 5 wt %, respectively based on the total weight of the positive active material layer.

The binder may help improve binding properties of positive active material particles with one another and with a current collector. Examples of the binder may include polyvinyl alcohol, carboxymethyl cellulose, hydroxypropyl cellulose, diacetyl cellulose, polyvinylchloride, carboxylated polyvinyl chloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon.

The conductive material may be included to provide electrode conductivity. A suitable electrically conductive material may be used as a conductive material unless it causes a chemical change in a battery. Examples of the conductive material may include a carbon material such as natural graphite, artificial graphite, carbon black, acetylene black, ketjen black, a carbon fiber, and the like; a metal material of a metal powder or a metal fiber including copper, nickel, aluminum, silver, and the like; a conductive polymer such as a polyphenylene derivative; or a mixture thereof.

In an implementation, the current collector may include, e.g., an aluminum foil, a nickel foil, or a combination thereof.

The positive electrode may be prepared mixing a positive active material, a binder, and optionally a conductive material in a solvent to prepare an active material composition and coating the active material composition on a current collector. In an implementation, the solvent may include, e.g., N-methylpyrrolidone.

The electrolyte may include a non-aqueous organic solvent and a lithium salt.

The non-aqueous organic solvent serves as a medium for transmitting ions taking part in the electrochemical reaction of a battery.

The non-aqueous organic solvent may include a carbonate, ester, ether, ketone, alcohol, or aprotic solvent.

The carbonate solvent may include dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), butylene carbonate (BC), or the like. The ester solvent may include methyl acetate, ethyl acetate, n-propyl acetate, t-butyl acetate, methylpropionate, ethylpropionate, propylpropionate, γ-butyrolactone, decanolide, valerolactone, mevalonolactone, caprolactone, or the like. The ether solvent may include dibutyl ether, tetraglyme, diglyme, dimethoxyethane, 2-methyltetrahydrofuran, tetrahydrofuran, or the like. The ketone solvent may include cyclohexanone or the like. The alcohol solvent may include ethanol, isopropyl alcohol, or the like. The aprotic solvent may include nitriles such as R—CN (wherein R is a hydrocarbon group having a C2 to C20 linear, branched, or cyclic structure and may include a double bond, an aromatic ring, or an ether bond), and the like, dioxolanes such as 1,3-dioxolane and the like, and sulfolanes and the like.

The non-aqueous organic solvent may be used alone or in a mixture. When the organic solvent is used in a mixture, a mixture ratio may be controlled in accordance with a desired battery performance.

The carbonate solvent may be a mixture of a cyclic carbonate and a chain carbonate. In this case, the cyclic carbonate and the chain carbonate may be mixed and used in a volume ratio of 1:1 to 1:9, and the performance of the electrolyte may be improved.

When the non-aqueous organic solvent is used in a mixture, a mixed solvent of a cyclic carbonate and a chain carbonate; a mixed solvent of a cyclic carbonate and a propionate solvent; or a mixed solvent of a cyclic carbonate, a chain carbonate, and a propionate solvent may be used. The propionate solvent may include, e.g., methyl propionate, ethyl propionate, propyl propionate, or a combination thereof.

In an implementation, when the cyclic carbonate and the chain carbonate or the cyclic carbonate and the propionate solvent are mixed, they may be mixed in a volume ratio of 1:1 to 1:9 and thus performance of an electrolyte solution may be improved. In an implementation, when the cyclic carbonate, the chain carbonate, and the propionate solvent are mixed, they may be mixed in a volume ratio of 1:1:1 to 3:3:4. The mixing ratios of the solvents may be appropriately adjusted according to desired properties.

The non-aqueous organic solvent may further include an aromatic hydrocarbon organic solvent in addition to the carbonate solvent. In an implementation, the carbonate solvent and the aromatic hydrocarbon organic solvent may be mixed in a volume ratio of 1:1 to 30:1.

The aromatic hydrocarbon organic solvent may include an aromatic hydrocarbon compound of Chemical Formula 1.

[Chemical Formula 1]

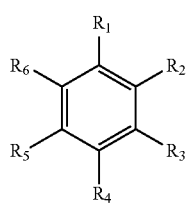

In Chemical Formula 1, $R_1$ to $R_6$ may each independently be, e.g., hydrogen, a halogen, a C1 to C10 alkyl group, a haloalkyl group, or a combination thereof.

Examples of the aromatic hydrocarbon organic solvent may include benzene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, toluene, fluorotoluene, 2,3-difluorotoluene, 2,4-difluorotoluene, 2,5-difluorotoluene, 2,3,4-trifluorotoluene, 2,3,5-trifluorotoluene, chlorotoluene, 2,3-dichlorotoluene, 2,4-dichlorotoluene, 2,5-dichlorotoluene, 2,3,4-trichlorotoluene, 2,3,5-trichlorotoluene, iodotoluene, 2,3-diiodotoluene, 2,4-diiodotoluene, 2,5-diiodotoluene, 2,3,4-triiodotoluene, 2,3,5-triiodotoluene, xylene, and a combination thereof.

The electrolyte may further include vinylene carbonate or an ethylene carbonate compound represented by Chemical Formula 2 as an additive for improving the cycle-life of a battery.

[Chemical Formula 2]

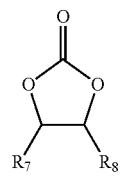

In Chemical Formula 2, $R_7$ and $R_8$ may each independently be, e.g., hydrogen, a halogen, a cyano group (CN), a nitro group ($NO_2$), or a fluorinated C1 to C5 alkyl group. In an implementation, at least one of $R_7$ and $R_8$ may be a halogen, a cyano group (CN), a nitro group ($NO_2$), and a fluorinated C1 to C5 alkyl group and both of $R_7$ and $R_8$ are not hydrogen.

Examples of the ethylene carbonate compound may include difluoroethylene carbonate, chloroethylene carbonate, dichloroethylene carbonate, bromoethylene carbonate, dibromoethylene carbonate, nitroethylene carbonate, cyanoethylene carbonate, or fluoroethylene carbonate. The amount of the additive for improving the cycle-life may be used within an appropriate range.

The electrolyte may further include vinylethylene carbonate, propane sultone, succinonitrile, or a combination thereof, and the amount thereof may be suitably controlled.

The lithium salt dissolved in the organic solvent may supply lithium ions in a battery, may facilitate a basic operation of a rechargeable lithium battery, and may help improve transportation of the lithium ions between positive and negative electrodes. Examples of the lithium salt may include $LiPF_6$, $LiBF_4$, $LiSbF_6$, $LiAsF_6$, $LiN(SO_2C_2F_5)_2$, $Li(CF_3SO_2)_2N$, $LiN(SO_3C_2F_5)_2$, $Li(FSO_2)_2N$ (lithium bis (fluorosulfonyl)imide LiFSI), $LiC_4F_9SO_3$, $LiClO_4$, $LiAl_2$, $LiAlCl_4$, $LiPO_2F_2$, $LiN(C_xF_{2x+1}SO_2)(C_yF_{2y+1}SO_2$ (wherein x and y are a natural number, for example, an integer of 0 to 20), lithium difluoro(bisoxolato) phosphate, LiCl, LiI, LiB $(C_2O_4)_2$ (lithium bis(oxalato) borate: LiBOB), and lithium difluoro(oxalato) borate (LiDFOB). The lithium salt may be used in a concentration ranging from 0.1 M to 2.0 M. When the lithium salt is included at the above concentration range, an electrolyte may have excellent performance and lithium ion mobility due to optimal electrolyte conductivity and viscosity.

A separator may be between the positive electrode and the negative electrode depending on a type of the lithium secondary battery. Such a separator may include polyethylene, polypropylene, and polyvinylidene fluoride, and multi-layers thereof such as a polyethylene/polypropylene double-layered separator, or a polyethylene/polypropylene/polyethylene triple-layered separator.

Figure 3:
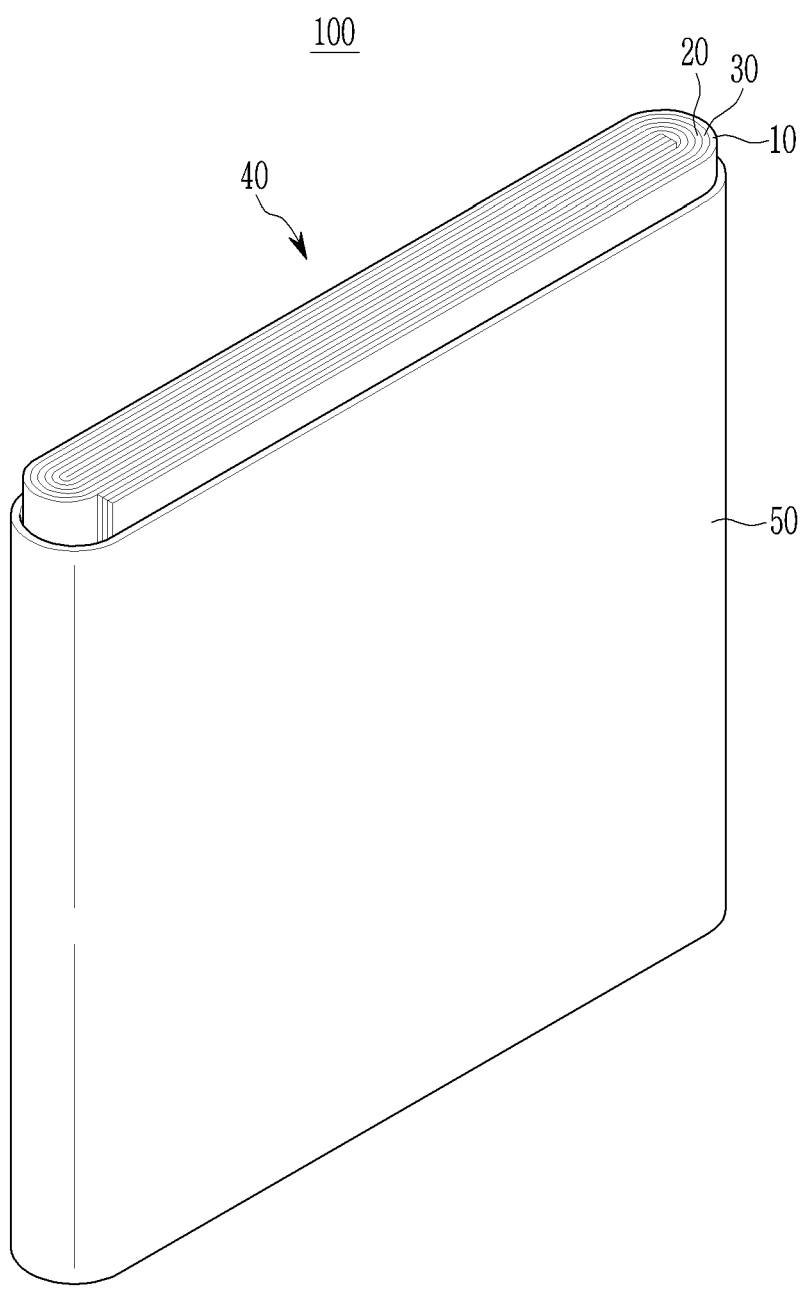
FIG. 3 is a schematic view of a structure of a rechargeable lithium battery according to one embodiment.

FIG. 3 is an exploded perspective view of a lithium secondary battery according to an embodiment. In an implementation, as illustrated in FIG. 3, the lithium secondary battery may be a prismatic battery. In an implementation, the lithium secondary battery may include other shaped batteries, e.g., a cylindrical or pouch type of battery.

Referring to FIG. 3, a lithium secondary battery 100 according to an embodiment may include an electrode assembly 40 (e.g., manufactured by winding a separator 30 between a positive electrode 10 and a negative electrode 20), and a case 50 housing the electrode assembly 40. The positive electrode 10, the negative electrode 20, and the separator 30 may be impregnated in an electrolyte solution.

The following Examples and Comparative Examples are provided in order to highlight characteristics of one or more embodiments, but it will be understood that the Examples and Comparative Examples are not to be construed as limiting the scope of the embodiments, nor are the Comparative Examples to be construed as being outside the scope of the embodiments. Further, it will be understood that the embodiments are not limited to the particular details described in the Examples and Comparative Examples.

Example 1

Si particles were pulverized to prepare Si nanoparticles having an average particle diameter D50 of 100 nm. The Si nanoparticles were a flake type and had an aspect ratio (width/thickness) of 7. A full width at half maximum, FWHM (111) of a diffraction peak of the Si nanoparticles was measured by X-ray diffraction using a CuKα ray and was 0.6 degrees (°).

The prepared Si nanoparticles and stearic acid were added to an ethanol solvent at a 90:10 weight ratio and mixed, followed by dispersing to prepare a dispersion liquid of Si particles.

The prepared dispersion liquid of Si particles was spray dried at 120° C. using a spray-dryer.

60 wt % of the obtained spray-dried product at was mixed with 40 wt % of a mesocarbon pitch, and the mixture was heat-treated at 1,000° C. under a nitrogen gas atmosphere to prepare a first negative active material. During the heat-treatment, the silicon particles reacted with the mesocarbon pitch to produce SiC on a surface of the Si particles (along with amorphous carbon).

The produced first negative active material included secondary particles in which primary particles including the Si particles and SiC on the surface of the Si particles in the form of an island were agglomerated, and the amorphous carbon surrounded the secondary particles. The first negative active material was produced with a structure in which all secondary particles were surrounded by the amorphous carbon. The Si particles had an average particle diameter D50 of 100 nm, the SiC had an average particle diameter D50 of 3 nm, an amount of the Si particles was 63 wt %, based on 100 wt % of the entire first negative active material, and the amount of the SiC was 10 wt %, based on 100 wt % of the entire first negative active material. The secondary particles had an average particle diameter D50 of 8 μm, the thickness of the amorphous carbon on the surface of the secondary particles was 15 nm, and the amount of the amorphous carbon was 27 wt %, based on 100 wt % of the entire first negative active material.

98 wt % of a mixed active material of the first negative active material and a natural graphite second negative active material (15:83 weight ratio, that is, 15.3:84.7 wt %, about 1:5.53 weight ratio), 1 wt % of a styrene-butadiene rubber binder, and 1 wt % of carboxymethyl cellulose as an agent for increasing viscosity were mixed in a water solvent to prepare a negative active material slurry. The produced negative active material slurry was coated on a Cu current collector, dried, and compressed to produce a negative electrode including a negative active material layer formed on the current collector.

Using the negative electrode, a lithium metal counter electrode, and an electrolyte, a half-cell was fabricated. As the electrolyte, $LiPF_6$ dissolved in a mixed solvent of ethylene carbonate, dimethyl carbonate, and ethyl methyl carbonate (20:40:40 volume ratio) to a concentration of 1.5M was used.

Example 2

A first active material was prepared by the same procedure as in Example 1, except that 60 wt % of the spray-dried product was mixed with 40 wt % of the mesocarbon pitch, and the mixture was heat treated at 1,050° C. under a nitrogen gas atmosphere.

The produced first negative active material included secondary particles in which primary particles including the Si particles and SiC on the surface of the Si particles in the form of a layer were agglomerated, and the amorphous carbon surrounded the secondary particles. The first negative active material was produced with a structure in which all secondary particles were surrounded by the amorphous carbon. The Si particles had an average particle diameter D50 of 100 nm, the SiC had an average particle diameter D50 of 5 nm, an amount of the Si particles was 60 wt %, based on 100 wt % of the entire first negative active material, and the amount of the SiC was 15 wt %, based on 100 wt % of the entire first negative active material. The secondary particles had an average particle diameter D50 of 8 μm, the thickness of the amorphous carbon on the surface of the secondary particles was 13 nm, and the amount of the amorphous carbon was 25 wt %, based on 100 wt % of the entire first negative active material.

Using the first negative active material and a natural graphite second negative active material, a negative electrode and a half-cell were fabricated by the same procedure as in Example 1.

Comparative Example 1

A first active material was prepared by the same procedure as in Example 1, except that 60 wt % of the spray-dried product was mixed with 40 wt % of a mesocarbon pitch, and the mixture was heat treated at 1,200° C. under a nitrogen gas atmosphere.

The produced first negative active material included secondary particles in which primary particles including the Si particles and SiC on the surface of the Si particles in the form of a layer, were agglomerated and an amorphous carbon surrounded on the secondary particles. The first negative active material was produced with a structure in which all secondary particles were surrounded by the amorphous carbon. The Si particles had an average particle diameter D50 of 100 nm, the SiC had an average particle diameter D50 of 10 nm, an amount of the Si particles was 53 wt %, based on 100 wt % of the entire first negative active material, and the amount of the SiC was 25 wt %, based on 100 wt % of the entire first negative active material. The secondary particles had an average particle diameter D50 of 8 μm, the thickness of the amorphous carbon positioned on the surface of the secondary particles was 10 nm, and the amount of the amorphous carbon was 22 wt %, based on 100 wt % of the entire first negative active material.

98 wt % of mixed active material of the first negative active material and a natural graphite second negative active material (15:83 weight ratio, that is, 15.3:84.7 wt %, about 1:5.53 weight ratio), 1 wt % of a styrene-butadiene rubber binder, and 1 wt % of carboxymethyl cellulose as an agent for increasing viscosity were mixed in a water solvent to prepare a negative active material slurry. The produced negative active material slurry was coated on a Cu current collector, dried, and compressed to produce a negative electrode including a negative active material layer formed on the current collector.

Using the negative electrode, a lithium metal counter electrode, and an electrolyte, a half-cell was fabricated. As the electrolyte, $LiPF_6$ dissolved in a mixed solvent of ethylene carbonate, dimethyl carbonate and ethyl methyl carbonate (20:40:40 volume ratio) to a concentration of 1.5 M was used.

Comparative Example 2

A first active material was prepared by the same procedure as in Example 1, except that 60 wt % of the spray-dried product was mixed with 40 wt % a mesocarbon pitch, and the mixture was heat-treated at 950° C. under a nitrogen gas atmosphere.

The produced first negative active material included secondary particles in which primary particles including the Si particles and SiC on the surface of the Si particles in the form of an island were agglomerated and an amorphous carbon surrounded the secondary particles. The first negative active material was produced with a structure in which all secondary particles were surrounded by the amorphous carbon. The Si particles had an average a particle diameter D50 of 100 nm, the SiC had an average a particle diameter D50 of 1 nm, an amount of the Si particles was 68 wt %, based on 100 wt % of the entire first negative active material, and an amount of the SiC was 3 wt %, based on 100 wt % of the entire first negative active material. The thickness of the amorphous carbon on the surface of the secondary particles was 16 nm, and the amount of the amorphous carbon was 29 wt %, based on 100 wt % of the entire first negative active material.

Using the first negative active material and a natural graphite second negative active material, a negative electrode and a half-cell were fabricated by the same procedure as in Example 1.

XRD Characteristic Measurement

1) XRD Characteristic Measurement of Negative Active Material

As for the negative active materials according to Examples 1 and 2, and Comparative Examples 1 and 2, an X-ray diffraction analysis (XRD) using a CuKα ray were measured to determine the peak intensity ratio ($I_{Si(111)}/I_{SiC(111)}$) of a peak intensity ($I_{Si(111)}$) at a Si (111) plane relative to a peak intensity ($I_{SiC(111)}$) at a SiC (111) plane. The results are shown in Table 1.

The X-ray diffraction analysis was performed under a condition of 2θ=40° to 50°, a scan speed (°/S) of 0.05, and a step size (°/step) of 0.02.

2) XRD Characteristic Measurement of Negative Electrode

The half-cells according to Examples 1 and 2, and Comparative Examples 1 and 2, underwent formation by charging and discharging at 0.1 C once and disassembled to obtain negative electrodes. As for these negative electrodes, an X-ray diffraction analysis (XRD) using a CuKα ray was performed to determine a peak intensity ratio ($I_{Gr(002)}/I_{SiC(111)}$) of a peak intensity ($I_{Gr(002)}$) at a crystalline carbon (002) plane relative to a peak intensity ($I_{SiC(111)}$) at a SiC (111) plane. The results are shown Table. 1.

The X-ray diffraction analysis was performed under a condition of 2θ=40° to 50°, a scan speed (°/S) of 0.05, and a step size (°/step) of 0.02.

Capacity Measurement of First Negative Active Material

The half-cells according to Examples 1 and 2, and Comparative Examples 1 and 2, were charged and discharged at 0.2 C once, and the discharge capacity was measured. From the measured discharge capacity, the capacity of the first negative active material (capacity of the first negative active material=the measured discharge capacity−the second negative active material of 84.7 wt %*350) was obtained based on the ratio of the first negative active material and the second negative active material (theoretical capacity: 350 mAh/g). The results are shown in Table 1.

Measurement of Initial Efficiency and Charge Rate Capability and Discharge Rate Capability The half-cells according to Examples 1 and 2, and Comparative Examples 1 and 2, were charged and discharged at 0.2 C once and the initial efficiency which was a ratio of the discharge capacity relative to the charge capacity was obtained. The results are shown in Table 1.

The half-cells according to Examples 1 and 2, and Comparative Examples 1 and 2, were charged and discharged at 0.2 C once, then charged and discharged at 2 C once, and the charge and discharge capacities were measured. The ratio of 2 C discharge capacity relative to 0.2 C discharge capacity was obtained and the results are shown in Table 1 as a discharge rate capability (2 C/0.2 C). The ratio of 2 C charge capacity relative to 0.2 C charge capacity was obtained and the results are shown in Table 1 as a charge rate capability.

Measurement of Cycle-Life Characteristic

Half-cells according to Examples 1 and 2, and Comparative Examples 1 and 2, were charged and discharged at 1 C 100 times, and the ratio of the $100^{th}$ discharge capacity relative to the $1^{st}$ discharge capacity was calculated. The results are shown in Table 1 as capacity retention.

TABLE 1

|  | Comparative Example 2 | Example 1 | Example 2 | Comparative Example 1 |
|---|---|---|---|---|
| Peak intensity ratio ($I_{Si(111)}/I_{SiC(111)}$) | 100 | 20 | 8 | 2.5 |
| Peak intensity ratio ($I_{Gr(002)}/I_{SiC(111)}$) | 3,000 | 650 | 250 | 80 |
| Capacity of first negative active material (mAh/g) | 1,880 | 1,650 | 1,500 | 850 |

TABLE 1-continued

|  | Comparative Example 2 | Example 1 | Example 2 | Comparative Example 1 |
|---|---|---|---|---|
| Initial efficiency (%) | 91.2 | 90.9 | 90.7 | 88.0 |
| Discharge rate capability (2 C/0.2 C, %) | 92.3 | 94.2 | 94.9 | 90.8 |
| Charge rate capability (2 C/0.2 C, %) | 38.1 | 40.7 | 41.2 | 26.5 |
| Capacity retention (%) | 82.3 | 86.9 | 89.3 | 80.5 |

As may be seen in Table 1, the half-cells according to Examples 1 and 2, in which the negative active material had the peak intensity ratio ($I_{Si(111)}/I_{SiC(111)}$) within a range of 5 to 50, and the negative electrode had the peak intensity ratio ($I_{Gr(002)}/I_{SiC(111)}$) within a range of 150 to 1,500, exhibited excellent initial efficiency, high-rate charge rate capability, high-rate discharge rate capability, and capacity retention.

The half-cell according to Comparative Example 2, in which the negative active material had a high peak intensity ratio ($I_{Si(111)}/I_{SiC(111)}$) of 100, and the negative electrode also had high peak intensity ratio ($I_{Gr(002)}/I_{SiC(111)}$), exhibited good initial efficiency, but lower high-rate charge rate capability and high-rate discharge rate capability than Examples 1 and 2, and very low capacity retention.

The half-cell according to Comparative Example 1, in which the negative active material had a low peak intensity ratio ($I_{Si(111)}/I_{SiC(111)}$) of 2.5 and the negative electrode also had a low peak intensity ratio ($I_{Gr(002)}/I_{SiC(111)}$) of 80, exhibited lower initial efficiency and high-rate discharge rate capability than Example 1 and 2, and significantly lower high-rate charge rate capability and capacity retention.

By way of summation and review, as a negative active material, various carbon negative active materials such as artificial graphite, natural graphite, hard carbon, and the like have been used. Such a carbon negative material may have low capacity of about 360 mAh/g, and a silicon negative active material having a capacity of 2,500 mAh/g or more (which is four times or more higher than the carbon negative active material) have been considered. Silicon may exhibit severe volume expansion, which may occur during the charging and the discharging (300% relative to graphite), compared to the carbon negative active material, particularly graphite, and it may cause a side reaction with the electrolyte to severely occur, thereby consuming the electrolyte solution and resultantly deteriorating the cycle-life characteristic.

One or more embodiments may provide a negative active material for a rechargeable lithium battery exhibiting suppressed volume expansion and an excellent cycle-life characteristic.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A negative electrode for a rechargeable lithium battery, the negative electrode comprising:
   a physical mixture of a first negative active material and a crystalline carbon as a second active material, the crystalline carbon including graphite,
   wherein the first negative active material comprises secondary particles of agglomerated primary particles, the primary particles including Si particles with SiC on a surface of the Si particles; and
   an amorphous carbon surrounding the secondary particles,
   wherein the first negative active material has:
      a peak intensity ratio ($I_{Si(111)}/I_{SiC(111)}$) of a peak intensity ($I_{Si(111)}$) at a Si (111) plane relative to a peak intensity ($I_{SiC(111)}$) at a SiC (111) plane of about 5 to about 20 measured by X-ray diffraction analysis using a CuKα ray,
   wherein the crystalline carbon material has a peak intensity ratio ($I_{Gr(002)}/I_{SiC(111)}$) of a peak intensity ($I_{Gr(002)}$) at a crystalline carbon (002) plane relative to a peak intensity ($II_{SiC(111)}$) at a SiC (111) plane, measured by X-ray diffraction analysis using a CuKα ray of about 150 to about 1,500 in the negative electrode,
   wherein a thickness of the SiC on the surface of the Si is about 5 nm or less,
   wherein the negative active material includes:
      about 5 wt % to about 20 wt % of SiC,
      about 40 wt % to about 70 wt % of silicon, and
      27 wt % to about 50 wt % of the amorphous carbon, all wt % being based on 100 wt % of the entire negative active material, and
   wherein a full width at half maximum, FWHM (111), of a diffraction peak at a (111) plane found by X-ray diffraction of the Si particles using a CuKα ray is about 0.5 degrees (°) to about 7 degrees (°).

2. The negative active material for a rechargeable lithium battery as claimed in claim 1, wherein the amorphous carbon fills pores between the primary particles.

3. The negative electrode for a rechargeable lithium battery as claimed in claim 1, wherein:
   the SiC is continuously on the surface of the Si particles in a form of a layer, or
   the SiC is discontinuously on the surface of the Si particles in a form of a dot.

4. The negative electrode for a rechargeable lithium battery as claimed in claim 1, wherein the Si particles are of a flake type.

5. The negative electrode for a rechargeable lithium battery as claimed in claim 1, wherein the Si particles have an aspect ratio of about 5 to about 20.

6. The negative electrode for a rechargeable lithium battery as claimed in claim 1, wherein the Si particles have a particle diameter of about 10 nm to 200 nm.

7. A rechargeable lithium battery, comprising:
the negative electrode as claimed in claim 1;
a positive electrode; and
an electrolyte.

8. The negative electrode for a rechargeable lithium battery as claimed in claim 1, wherein the first negative active material includes:
about 5 wt % to about 20 wt % of SiC,
about 40 wt % to about 60 wt % of silicon, and
35 wt % to about 50 wt % of the amorphous carbon, all wt % being based on 100 wt % of the entire negative active material.

\* \* \* \* \*